Patented Apr. 21, 1942

2,280,649

UNITED STATES PATENT OFFICE 2,280,649

MANUFACTURE OF CATALYSTS

Elmer R. Kanhofer, Chicago, Ill., assignor to Universal Oil Products Company, Chicago, Ill., a corporation of Delaware No Drawing. Application July 26, 1940,
Serial No. 347,752

13 Claims. (Cl. 252—251)

This is a continuation-in-part of my co-pending application Serial No. 330,952, filed April 22, 1940.

This invention relates to the manufacture of adsorbents and catalysts especially suitable for accelerating reactions among hydrocarbons. More specifically, it has reference to a method of manufacturing finely divided adsorbents and catalytic materials which are particularly effective in selectively promoting the formation of high antiknock motor fuel from higher boiling hydrocarbons or petroleum fractions having low antiknock value. The preferred catalysts are particularly characterized by their fine texture and they comprise definite components and are prepared synthetically by definite procedures which are specific in the production of catalysts of high activity and stability.

Many manufacturing processes are generally known where hydrous oxide gels are composited in the preparation of adsorbents and catalysts useful in various treatments and reactions. Hydrated silica is one of the hydrous oxides which has been composited with various hydrous oxide gels such as alumina, for example, in the preparation of gel composites especially useful in water treatment. The conventional gels are prepared and composited by a number of different methods in which especial care is employed in the manner in which the reagents are mixed, the concentrations used, etc. so that the hydrated silica gel and/or other hydrous gels composited either form a precipitated gel or a sol which sets on standing to form the gel composite. In contradistinction thereto, it has been found that a particularly desirable form of highly active and stable adsorbent or catalyst can be produced according to the present invention by the formation of finely divided precipitates upon powdered supports thereby incidentally avoiding, among other things, the major difficulties which usually attend washing and filtration treatment of undried gels.

In one specific embodiment the present invention comprises the manufacture of catalytic material suitable for use in hydrocarbon conversion reactions by disposing upon finely divided particles of a refractory support, a hydrated silica in the presence of an added substance capable of depositing hydrated silica upon said finely divided support without materially increasing the particle size thereof, and compositing the finely divided and supported hydrated silica with hydrated alumina, hydrated zirconia or hydrated alumina and hydrated zirconia.

In a further embodiment said catalytic material may be prepared by precipitating the hydrated silica and promoting hydrated oxide upon the finely divided refractory support in the presence of an added substance capable of depositing the precipitate upon the support as a thin coating without materially increasing the size of the supporting particles.

According to this invention, an intimate mixture of hydrated silica and an activating hydrous oxide is disposed upon a finely divided refractory support to produce finely divided, supported particles of catalytic material. The refractory supporting material includes powdered diatomaceous earth, kaolin, china clay, pumice, sand, carborundum, quartz, fine powders of alumina, zirconia, thoria, titania, chromite, rutile, illmenite zircon, bauxite, etc. Many of these materials may have catalytic properties in various chemical reactions and some of them influence hydrocarbon cracking reactions. It is of particular importance to note however that all of these materials have little or no activity as compared with the specially prepared catalysts precipitated according to the present invention. The supports are of value only in so far as they are refractory materials which will not fuse or sinter when exposed to high temperature conditions for a long period of time. Where one of these materials having the greatest amount of activity and another having no activity in influencing hydrocarbon reactions are used as supports under corresponding conditions, no substantial difference is reflected in the activity of the supported catalytic materials.

The amount of support used may be up to 50 per cent or more by weight of the completed catalytic material. The smaller the particle size of the support, the more suitable it is for the purposes of the invention. The smaller the particles, generally speaking, the more readily they are suspended in and contacted with the hydrocarbon oil undergoing treatment. The size of the particles of the support is only slightly increased by the deposition of catalyst thereon. In the scope of the invention the supported catalytic material has substantially the same activity as the active unsupported catalyst. The anti-knock value of the gasoline produced in contact with the catalysts is practically the same and the yield is only slightly less for the supported catalyst. The supported catalyst has the advantage of lower carbon and gas formation. The powder supports supply the centers or minute cores upon which the catalyst is precipitated. The particles are not substantially increased in size because hydrated silica or hydrated silica and hydrous oxide are precipitated on the support in the presence of an added soluble substance. The added substance of which sodium chloride is an example promotes the formation of finely divided particles as small as 1 to 10 microns when properly employed without the presence of supports. These added substances are described in the following paragraph. The amount of these substances employed is not only controlled by the type of added substances and the manner in which they are added to the reactants but also by the dilution of the reactants and the rate of mixing as will be hereinafter illustrated. Various procedures may also be utilized in compositing and purifying the hydrous oxides as will also be hereinafter described.

Substances which may be present in solution to effect the formation of fine precipitates of the hydrous oxides may be of a number of different types but are not equivalent in concentration and manner used or in their relative effects. Although all alkali metal and soluble alkaline earth salts do not necessarily function in the desired manner, it may be generally stated that a large number of salts of weak acids as well as of strong acids exhibit the desired effect. In the preparation of hydrated silica from water-glass solutions by the addition of hydrochloric acid for example, the proper addition of sodium chloride gives one useful result. The anions of the alkali metal and/or ammonium salts which are used may constitute the halides, the sulfates, the nitrates the carbonates, the phosphates and the acetates, the citrates, oxalates or other salts of organic acids. A large number of other salts having various cations may also be employed. The various soluble alkaline earth salts for example may be used such as calcium chloride and the supported hydrated silica particles may then be filtered and washed substantially free from the added salts and/or alkali metal impurities. Other metal salts may also have special applications. Organic substances or compounds may be added under selected conditions either in addition to, or in some specific cases, separately from the inorganic or mixed salts above indicated. Miscible solvents may be added such as alcohols or ketones. Polyhydric alcohols, or polyhydric phenols and other aromatics, for example, tannin and resorcinol, or numerous colloids may be employed. Polybasic amines, inorganic polybases such as hydrazine, or certain complex ammono derivatives of inorganic salts as illustrated by magnesium ammono chloride or sulfate, or copper ammonium complex may also be used in forming the desired finely divided precipitates or composites.

Various methods may be employed in compositing the supported catalytic material depending upon the particular use to which the product is to be put and the degree of purity desired in the final product. According to one general method, a finely divided and supported hydrated silica may be prepared by diluting an alkali metal silicate such as a commercial grade of water glass with approximately 3-10 times its volume of a solution wherein the finely divided support is suspended and in which an added amount of the substance facilitating the formation of finely divided, hydrated silica particles is disposed in the proper concentration prior to the precipitation of the hydrated silica upon the support. According to this method, as a specific example, finely ground diatomaceous earth amounting to approximately 50% by weight of the final product may be dispersed in a solution containing a definite amount of sodium chloride relative to the dilution and kind of water glass employed. Acid is then gradually added while thoroughly agitating, in an amount sufficient to precipitate hydrated silica as a thin coating upon the refractory support. The rate of addition of the acid should not be too rapid. It is necessary even where the proper amount of the added substance is present to thoroughly mix the reactants in streams or by agitation and employ times of 5 to 20 minutes or more depending upon the size of the batch, mixing conditions, etc.

As a specific example of compositing the hydrous oxides, the finely divided and supported hydrated silica prepared in the above manner may be admixed while still in suspension with a solution of a salt of the metal of which a hydrated oxide is to be precipitated in the presence of the finely divided and supported hydrated silica, and an alkaline precipitant added to precipitate the hydrous oxide. For the supported adsorbent or catalyst prepared in this manner, the hydrated silicon dioxide is precipitated in the presence of not only the added salt, but also the salt formed by the neutralization of the alkali metal silicate with the acid added to precipitate the hydrated silica, and another hydrous oxide is subsequently admixed in the presence of these salts. These salts or salt solutions in this and subsequent procedures may be re-used when repeating the preparations. Variations of this procedure may be employed whereby, by way of example, the primary supported hydrated silica which is filtered and separated from the salt solution and which may also be washed and purified, if desired, is then reslurried or otherwise handled for compositing with the remaining hydrous oxide component. According to this latter method, a finely divided hydrated silica may be precipitated upon the support, filtered and washed to remove alkali metal impurities by methods which will be subsequently described, and the purified supported hydrated silica then dispersed in a solution containing aluminum chloride, and hydrated alumina precipitated in the presence of the finely divided hydrated silica by the addition of ammonium hydroxide.

According to still another procedure a solution of a soluble silicon compound may be mixed with a solution of a metal compound whose hydrous oxide is to be co-precipitated with hydrated silica, mixing in also the finely divided support and the added substance with either or both of the reactants, and adjusting the hydrogen ion concentration of the reactants or reaction mixture depending in large measure upon the proportions and character of the added substance. In this case also the precipitate is formed upon the support when proper conditions of concentration, mixing, dilution and pH conditions are observed. Various co-precipitation procedures are possible depending upon whether silicates are used or silicon salts.

The hydrous oxides composited with the finely divided, hydrated and supported silica may be those of aluminum, zirconium, vanadium, thorium, chromium, molybdenum and numerous other metals yielding composites with hydrated silica having catalytic and adsorbent properties. As a result of the procedures preferably employed, the supported hydrous oxides are very intimately intermingled and/or the hydrous oxides are precipitated in the presence of specially prepared supported silica and disposed in and on the surfaces in the finished catalyst. Various proportions of the hydrous oxides may be employed, the more frequent practice being to employ minor amounts of added hydrous oxides and major proportions of the hydrated silicon dioxide. Thus in the preparation of highly effective supported silica-alumina catalysts, approximately 5 to 30 percent of hydrated alumina is preferably composited with the hydrated silicon dioxide present in the catalyst. Smaller and higher proportions of alumina may also be utilized but generally speaking without the same catalytic effectiveness. Similarly, hydrated zirconia or other hydrous oxides may be employed, or mixtures of these hydrous oxides such as alumina and zirconia for example, by compositing several mols of alumina and 5 to 10 mols of zirconia with 100 mols of the specially prepared silicon dioxide on the unsupported basis.

Suspensions of the supported precipitates or composites are directed to any convenient form of filtration apparatus such a filter press or centrifugal filter, wherein the great bulk of the liquid is removed and a filter cake formed which may be washed if desired with comparative ease as contrasted with gelatinous precipitates or gels. It has been found desirable when producing the catalyst in a highly active and stable form to carefully wash the supported precipitates and/or composites free from salts and particularly alkali metal impurities. This may be accomplished by various forms of washing treatment such as more or less prolonged washing with various acidic and salt solutions. Water acidulated with strong acids for example, or solutions of strong acid salts of ammonium or metals corresponding to those of the added metal oxides, may be suitable and the material may be purified before or after drying treatment. These purification washes may be carried out as indicated above prior to compositing of the specially prepared hydrated silica with the remaining hydrous oxides. The composite material may be finally dried at temperatures of approximately 200-250° F., more or less. Although the supported catalyst is particularly desirable for contacting with hydrocarbon oil as a powder, it may however be formed into shaped particles by the conventional consolidating and shaping processes such as pilling and briquetting, or the material may be extruded. Various lubricants may be employed to facilitate pelleting or forming operations such as graphite, hydrogenated vegetable oil, certain metal palmitates and stearates, etc., and organic materials such as flour, starch, etc.

The finely divided supported powder is highly suitable as a catalyst to be suspended in a stream of oil and processed under suitable conditions of temperature, pressure and contact time to carry out hydrocarbon conversion reactions to produce large yields of high antiknock gasoline. The kind of powdered catalyst used is not restricted to any single preparation procedure and various types of oil cracking may be carried out in the presence of the powdered catalyst. In the cracking of a relatively heavy oil where in some cases it may not be desired to recover the catalyst, it may not be necessary to purify or even dry the powdered product. On the other hand, in many operations it will be desirable to use a highly stable form of the catalyst which is separated from residual and carbonaceous deposits and repeatedly regenerated. Large yields of gasoline may be obtained per pass having high octane number as is illustrated in the specific examples given below. The powdered catalyst may then be separated from the oil by various procedures and the separated catalyst regenerated by removing hydrocarbonaceous deposits as by solvent treatment or heating in the presence of air for example, whereupon it is used again either alone or in admixture with fresh catalyst in suspension in the hydrocarbon oil processed. The usefulness of this material however is not restricted to powdered catalyst since the material may be formed into contact masses as above described and disposed in beds of catalyst reactors and preheated vapors passed therethrough at reaction temperature. In this type of apparatus the catalyst is intermittently regenerated by heated oxidizing gas for example whereby carbonaceous deposits are removed.

The following specific examples are given to illustrate specific applications of the process of the invention, the activity of the catalyst preparation also being indicated. The invention should not be considered as limited to these examples of the process or to the particular catalyst preparation since these are given as illustrations of the novelty and utility of the invention.

*Example I*

A sample of a powdered support catalyst having the approximate catalytic composition of $100SiO_2:5Al_2O_3$ may be prepared as follows: 180 pounds of commercial water glass containing 8.9% $Na_2O$ and 28.5% $SiO_2$ is added to approximately 140 gallons of water containing in suspension approximately 25 pounds of a very finely pulverized diatomaceous earth. 90 pounds of sodium chloride is also dissolved in the liquid and concentrated hydrochloric acid diluted with an equal volume of water is gradually added while agitating. While the acid is gradually added a siliceous precipitate is deposited upon the suspended diatomaceous earth while the solution is still alkaline. A slight excess of acid is then added and the excess acid substantially neutralized with ammonium hydroxide. The supported silica suspension is then pumped into another tank containing approximately 20 gallons of aluminum chloride in solution, the aluminum content being substantially the amount present in the final catalyst. Ammonium hydroxide solution is then added to precipitate hydrated alumina in the presence of the supported silica and the composite precipitate is then filtered in a filter and dried until substantial dryness at approximately 250° F. The dried material is then slurried in water and directed to the filter where it is carefully washed with acidulated water until the washings are free from alkali metal ions.

Catalyst prepared in this manner when mixed to the extent of approximately ½ of 1% with a Pennsylvania gas oil of approximately 36° A. P. I. gravity and heated to a reaction temperature of approximately 800° F. at about 50 pounds per square inch pressure will yield 25 volume percent of a 400° F. end point gasoline having an octane number of 76 in a single pass. The catalyst is readily separated from the oil and is capable of further use on regeneration either alone or in admixture with fresh catalyst.

*Example II*

A sample of powdered supported catalyst may be prepared as follows: 90 pounds sodium chloride are dissolved in 140 gallons of water containing in suspension approximately 15 pounds of a very finely pulverized clay and 160 pounds of commercial water glass is added to the clay suspension and further diluted to approximately 165 gallons. Concentrated hydrochloric acid is gradually added to the clay suspension in water glass and salt solution while agitating. The addition of acid is continued until the liquid still remains slightly alkaline whereupon hydrated silica is deposited upon the finely divided clay to form a finely divided suspension. An excess of acid is then added and the excess acid substantially neutralized with ammonium hydroxide. The supported hydrated silica is filtered on a centrifugal filter saving the salt solution for re-use in subsequent batches and is then carefully washed with water acidulated with hydrochloric acid until the supported silica is substantially free from alkali metal ions. The purified supported silica is suspended in water and pumped into a tank containing approximately 20 gallons of a solution having dissolved therein 20 pounds of aluminum chloride. Ammonium hydroxide solution is added to precipitate hydrated alumina in the presence of a finely divided hydrated silica suspension, ammonium hydroxide being added until the solution is substantially neutral. The composite precipitate is filtered and water washed. The washed cake is dried at approximately 225° F. The dried material is a fluffy powder of fine texture.

Catalysts prepared in this manner when admixed to the extent of approximately ½ of 1% by weight with Pennsylvania gas oil of approximately 36° A. P. I. gravity and heated to a reaction temperature of approximately 800° F. at 50 pounds per square inch will yield in a single pass about 25 volume percent of 400° F. end-point gasoline having an octane number of 78. The catalyst may be readily separated from the oil and further used on regeneration either alone or in admixture with fresh catalyst.

I claim as my invention:

1. A process for the manufacture of supported adsorbent and catalytic material suitable for use in hydrocarbon conversion reactions which comprises precipitating a hydrated silica upon finely divided particles of a refractory support in the presence of an added substance capable of promoting the formation of finely divided hydrated silica particles, said substance being in an amount such that the silica precipitates in the form of finely divided particles, and disposing upon said finely divided and supported hydrated silica, a hydrous oxide capable of activating the hydrated silica for use in said hydrocarbon conversion reactions.

2. A process as defined in claim 1 and further characterized by collecting in quantity the produced composite of supporting refractory particles and hydrated silica and hydrous oxide, filtering to remove excess water and drying the same.

3. A process for the manufacture of supported catalytic material suitable for use in hydrocarbon conversion reactions which comprises precipitating a hydrated silica upon finely divided particles of a refractory support in the presence of an added substance capable of promoting the formation of finely divided hydrated silica particles, said substance being in an amount such that the silica precipitates in the form of finely divided particles, and disposing alumina upon said finely divided and supported hydrated silica.

4. A process for the manufacture of supported catalytic material suitable for use in hydrocarbon conversion reactions which comprises precipitating a hydrated silica upon finely divided particles of a refractory support in the presence of an added substance capable of promoting the formation of finely divided hydrated silica particles, said substance being in an amount such that the silica precipitates in the form of finely divided particles, and disposing zirconia upon said finely divided and supported hydrated silica.

5. A process for the manufacture of supported catalytic material suitable for use in hydrocarbon conversion reactions which comprises precipitating a hydrated silica upon finely divided particles of a refractory support in the presence of an alkali metal compound capable of promoting the formation of finely divided hydrated silica particles, said compounds being in an amount such that the silica precipitates in the form of finely divided particles and disposing upon said finely divided and supported hydrated silica, a hydrous oxide capable of activating the hydrated silica for use in said hydrocarbon conversion reactions.

6. A process for the manufacture of supported catalytic material suitable for use in hydrocarbon conversion reactions which comprises precipitating hydrated silica upon a finely divided refractory support by the acidification of an alkaline silicate solution containing said finely divided refractory support and an added substance capable of promoting the formation of finely divided particles of hydrated silica, said substance being in an amount such that the silica precipitates in the form of finely divided particles, and precipitating alumina upon said supported hydrated silica.

7. A process for the manufacture of supported catalytic material suitable for use in hydrocarbon conversion reactions which comprises precipitating hydrated silica upon a finely divided refractory support by the acidification of an alkaline silicate solution containing said finely divided refractory support and an added substance capable of promoting the formation of finely divided particles of hydrated silica, said substance being in an amount such that the silica precipitates in the form of finely divided particles, and precipitating zirconia upon said supported hydrated silica.

8. A process for the manufacture of supported catalytic material in a finely divided form suitable for use in hydrocarbon conversion reactions which comprises precipitating hydrated silica upon a finely divided refractory support by the acidification of an alkali metal silicate solution containing said finely divided refractory support and an amount of sodium chloride such that the silica precipitates in the form of finely divided particles, and precipitating alumina upon said supported hydrated silica.

9. A process for the manufacture of supported catalytic material in a finely divided form suitable for use in hydrocarbon conversion reactions which comprises precipitating hydrated silica upon a finely divided refractory support by the acidification of an alkali metal silicate solution containing said finely divided refractory support and an amount of sodium chloride such that the silica precipitates in the form of finely divided particles, and precipitating zirconia upon said supported hydrated silica.

10. A process for the manufacture of supported catalytic material suitable for use in hydrocarbon conversion reactions which comprises precipitating hydrated silica upon a finely divided refractory support by the acidification of an alkali metal silicate solution containing said finely divided refractory support and an amount of sodium chloride such that the silica precipitate in the form of finely divided particles, washing said supported hydrated silica free from alkali metal impurities and precipitating a hydrous oxide upon said purified and supported hydrated silica by suspending the supported hydrated silica in a solution of a salt of a metal selected from the group consisting of aluminum and zirconium and adding ammonium hydroxide.

11. A process for the manufacture of supported catalytic material suitable for use in hydrocarbon conversion reactions which comprises precipitating hydrated silica upon a finely divided refractory support by the acidification of an alkali metal silicate solution containing said finely divided refractory support and an amount of sodium chloride such that the silica precipitates in the form of finely divided particles, and precipitating alumina upon said supported hydrated silica, and purifying the product to remove alkali metal impurities.

12. A process for the manufacture of supported catalytic material suitable for use in hydrocarbon conversion reactions which comprises precipitating hydrated silica upon a finely divided refractory support by the acidification of an alkali metal silicate solution containing said finely divided refractory support and an amount of sodium chloride such that the silica precipitates in the form of finely divided particles, and precipitating zirconia upon said supported hydrated silica, and purifying the product to remove alkali metal impurities.

13. A process for the manufacture of supported catalytic material suitable for use in hydrocarbon conversion reactions which comprises precipitating a hydrated silica upon finely divided particles of a refractory support in the presence of an alkalinous metal compound capable of promoting the formation of finely divided hydrated silica particles, said compounds being in an amount such that the silica precipitates in the form of finely divided particles, and disposing upon said finely divided and supported hydrated silica a hydrous oxide selected from the group consisting of alumina and zirconia.

ELMER R. KANHOFER.